Patented July 15, 1941

2,249,278

UNITED STATES PATENT OFFICE 2,249,278

ABRASIVE BODY AND MANUFACTURE THEREOF

Samuel S. Kistler, Worcester, Mass., assignor to Norton Company, Worcester, Mass., a corporation of Massachusetts No Drawing. Application May 28, 1936, Serial No. 82,281

7 Claims. (Cl. 51—298)

The invention relates to abrasive bodies and a method of manufacture thereof, and with regard to its more specific features to grinding wheels bonded by phenol-formaldehyde resins and resins of a similar type.

One object of the invention is to provide a method of making a resinoid bonded grinding wheel or other abrasive body of dense structure. Another object of the invention is to provide an abrasive body consisting of abrasive grains bonded by an organic bond of extremely dense structure. Another object of the invention is to provide a grinding wheel of durable characteristics. Another object of the invention is to provide a method of bonding grinding wheels with organic bond avoiding swelling. Another object of the invention is to accelerate the production of organic resinoid bonded grinding wheels and other abrasive bodies. Another object of the invention is to remove water formed or occurring during the maturing of resinoid bonded abrasive bodies. Another object of the invention is to secure improved adhesion between abrasive grain and resinoid bond. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of abrasive grain. Any desired type of abrasive grain may be used, for example alumina in any of its forms, including fused alumina, emery and corundum, also silicon carbide and diamond. I may also use other hard carbides, such as those of boron, tungsten or tantalum. Within the limits of the invention any grain size or mixture of grain sizes whatsoever may be employed.

So far as certain features are concerned, the invention is not limited to specific methods of plasticizing the mass or wetting the abrasive grain or forming a moldable mixture, but for completeness I will now give a typical example of the method and composition of the invention, specifically pointing out a preferred manner of introducing the ingredients.

Taking 83.3 parts by weight of alumina abrasive grain, I place this in a mixing pan. I set aside 9.46 parts of powdered pheno-formaldehyde resin, such as is known under the trade-mark "Bakelite." I set aside 6.61 parts of cryolite and .63 part of quick lime, CaO.

The foregoing will be seen to add up to 100 parts and, therefore, may be considered as percentages. Having placed the required amount of alumina abrasive grain in the mixing pan, I add furfural, which is a liquid, in an amount equal to 65 cc. per pound of powdered phenol-formaldehyde resin. This furfural is allowed to drip or flow into the pan while the pan is rotating and the mixing is continued until each grain is coated with a thin film of the liquid. I mix together the three above-mentioned ingredients which come in powdered form, that is to say the phenol-formaldehyde resin, the cryolite and the quick lime. After the mixing of the abrasive grain and furfural has proceeded to the point where each abrasive grain is coated with a film of the liquid, I introduce the mixture of the three mentioned powdered substances, either through a hopper or a screen or by means of a scoop or the like. In other words, the powdered substances may be dumped into the mixing pan and thereafter the mixing is continued for a desired length of time until the powder has been spread throughout the mass and is found adhering to each individual abrasive grain, being wet by the liquid thereon.

I now add, while the mixing pan is still in action, neutral creosote oil in the amount of 20 cc. per pound of phenol-formaldehyde resin. The mixing is continued until the creosote oil has been thoroughly distributed through the mass of ingredients in the pan.

As the foregoing is a specific example only, I note that the creosote oil might be omitted altogether. Furthermore, instead of furfural I might use liquid phenol-formaldehyde resin or other liquid plasticizer. In the event that liquid phenol-formaldehyde resin is used, my total phenol-formaldehyde resin is still 9.46 parts, in the specific example given, of which 22½% of this total amount is liquid stage. The furfural or the liquid stage phenol-formaldehyde resin acts not only to form a part of the ultimate bond but also serves to plasticize the mass and enables me to achieve a coating of each abrasive grain with bond, and facilitates the distribution of the bond throughout the mass and permits the mixture to be cold molded.

Cryolite is a filler and I may use any other filler or omit the same altogether. In place of cryolite I might use a clay, quartz, calcium carbonate, calcium sulfate or many other minerals.

I may make a dense wheel by selecting different sizes of the abrasive grain.

Having made a mixture according to the foregoing example or any variation thereof, I place a measured quantity in a suitable mold and press to form a compact structure, for example in the form of a grinding wheel. By reason of the plasticity of the mass, the mixture of abrasive grain and bond, after being pressed, has sufficient coherence to constitute an article which may be handled and placed in a curing oven to be matured into the final product. I now mature the bond in a suitable oven at the usual temperature and for the usual time to produce a grinding wheel or other abrasive body bonded with an organic resinoid bond of the type described. For example, I may raise the heat over a period of 52 hours to a temperature of 175° C., then maintain it at that temperature for 20 hours, and thereafter cool to room temperature over a period of 10 hours.

In the maturing of the phenol-formaldehyde resin, including phenol-formaldehyde resins having a part thereof consisting of furfural resin, the action which takes place to convert the unmatured substance into the thermally irreversible and strong final product has been referred to as a polymerization process. I have observed that this process is accompanied by the formation and liberation of water. This has, in the past, caused detrimental swelling of grinding wheels being matured, and in order to avoid such swelling a very slow temperature rise has been resorted to. I have discovered that by using a dehydrating agent I can remove the water so formed and liberated, thus inhibiting the swelling of the grinding wheel or other abrasive object. Furthermore, owing to this swelling caused by the liberation and formation of water, it has heretofore been difficult and in some cases impossible to make resinoid wheels of the type described of certain dense structures. By the use of a dehydrating agent as herein described, I am enabled to achieve denser structures as well as to achieve other structures of grinding wheels with fewer failures in the manufacturing operation. Also, I am enabled to raise the temperature more rapidly to the curing temperature and therefore complete this operation in a shorter time.

I may use other dehydrating agents besides quick lime or anhydrous calcium oxide. For example, I may use a partially dehydrated aluminum hydroxide, such as has been marketed under the name "Activated alumina." This substance has the property of taking up water rapidly. I may also use, for example, soluble anhydrite ($CaSO_4$).

Soluble anhydrite is preferably prepared by heating plaster-of-Paris to a temperature between 170° C. and 300° C. I may also use activated silica gel, which is silica gel dehydrated at a temperature below 500° C.

Each of these substances is an inert, neutral or non-acidic, inorganic, solid, granular substance having the property of reacting with or absorbing water at temperatures between normal temperature and 160° C. and particularly at a temperature above 100° C. at which the resinoid is converted to the infusible condition. Thus the water which is generated or released during the maturing process is removed as the temperature of the oven is raised until, when the maximum temperature is reached, the structure has become so rigid that swelling is impossible.

The reason why swelling takes place with the liberation or formation of water is that at temperatures above 100° C., the water forms bubbles of steam in the resin bond. By removing the water as fast as it is liberated or formed, such formation of steam is altogether avoided.

Grinding wheels produced according to the invention may be of dense structure or may be of other structures desired. In any event, economies of production are achieved and the quantity of off-grade products is reduced.

It will thus be seen that there has been provided by this invention a method and an article in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. An unswelled abrasive article comprising abrasive grains united by a dehydrated converted, infusible, phenol-formaldehyde resin and containing the reaction product of water from said resin combined with a non-acidic, inorganic dehydrating agent which by chemical combination takes up water of reaction at a temperature substantially above 100° C. during the stage of converting the resin at a temperature above 100° C. and said abrasive article containing substantially no uncombined water.

2. The method of preventing swelling during the making of an abrasive article comprising the steps of mixing abrasive grains with a solid unconverted phenol-formaldehyde resin powder, a liquid plasticizer and dry calcium oxide, CaO, shaping an article therefrom and subsequently heating the same to a temperature above 100° C. at which temperature the resin is converted to an infusible condition, and the resin is dehydrated as it cures by combining $H_2O$ with CaO.

3. The method of preventing swelling during the making of an abrasive article comprising the steps of mixing abrasive grains with an organic bond which consists of a powder comprising phenol-formaldehyde condensate, a liquid plasticizer, and a dry non-acidic inorganic dehydrating agent capable of taking up and holding the water of reaction at a temperature substantially above 100° C. during the stage of converting the resin at a temperature above 100° C., shaping an article therefrom, and subsequently heating the same to a temperature above 100° C., at which temperature the resin is converted to an infusible condition and is dehydrated by the chemical combination of the water, present in said powder and in the said plasticizer and any formed by the reaction of converting the resin to an infusible condition, with the non-acidic, inorganic dehydrating agent.

4. The method of preventing swelling during the making of an abrasive article comprising the steps of mixing abrasive grains with furfural, then adding an organic bond which consists of a powder comprising phenol-formaldehyde condensate and a dry non-acidic inorganic dehydrating agent capable of taking up and retaining water at a temperature substantially above 100° C., shaping an article therefrom, and subsequently heating the same to a temperature above 100° C., at which temperature the resin is converted to an infusible condition, and the resin is dehydrated by the chemical combination of the water in the said powder and water of reaction with the said dehydrating agent.

5. An unswelled abrasive article consisting of abrasive grains united by an organic bond which consists of a dehydrated synthetic resin comprising a phenol-formaldehyde condensate and containing a filler and the reaction product of water, formed during the reaction in curing the resin, combined with a non-acidic inorganic dehydrating agent which takes up and holds water of reaction at a temperature substantially above 100° C. during the stage of converting the resin at a temperature above 100° C.

6. The method of preventing swelling during the making of an abrasive article comprising the steps of mixing abrasive grains with a solid, unconverted phenol-formaldehyde resin powder, a liquid plasticizer, and "soluble anhydrite" ($CaSO_4$), shaping an article therefrom, and subsequently heating the same to a temperature above 100° C., at which temperature the resin is converted to an infusible condition, and the resin is dehydrated by the chemical combination of water in the said powder and water of reaction with the "soluble anhydrite" ($CaSO_4$) to produce $CaSO_4 \cdot 2H_2O$.

7. The method of preventing swelling during the making of an abrasive article comprising the steps of mixing abrasive grains with a solid, unconverted phenol-formaldehyde resin powder, a liquid plasticizer, and partially dehydrated aluminum hydroxide, shaping an article therefrom, and subsequently heating the same to a temperature above 100° C., at which temperature the resin is converted to an infusible condition, and the resin is dehydrated by the chemical combination of water in the said powder and water of reaction with the aluminum hydroxide.

SAMUEL S. KISTLER.